(12) United States Patent
Hatsuda et al.

(10) Patent No.: US 6,241,928 B1
(45) Date of Patent: Jun. 5, 2001

(54) METHOD FOR PRODUCTION OF SHAPED HYDROGEL OF ABSORBENT RESIN

(75) Inventors: Takumi Hatsuda, Takasago; Katsuhiro Kajikawa, Himeji; Hideyuki Tahara, Osaka; Koji Miyake, Okayama-ken; Akito Yano, Himeji; Takanori Murakami, Hyogo-ken, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/300,196

(22) Filed: Apr. 27, 1999

(30) Foreign Application Priority Data

Apr. 28, 1998 (JP) ................................ 10-119408
May 15, 1998 (JP) ................................ 10-133771
Aug. 24, 1998 (JP) ................................ 10-237705

(51) Int. Cl.[7] ....................................... B29D 7/01
(52) U.S. Cl. ............................................. 264/216
(58) Field of Search ............................ 264/212, 216, 264/330, 331.11, 331.15

(56) References Cited

U.S. PATENT DOCUMENTS

| | | | |
|---|---|---|---|
| 3,274,322 | 9/1966 | Scudder | 264/213 |
| 4,191,805 | 3/1980 | Nolte | 428/539 |
| 4,612,336 | 9/1986 | Yada et al. | 522/3 |
| 4,857,610 | 8/1989 | Chmelir et al. | 526/88 |
| 4,893,999 | 1/1990 | Chmelir et al. | 425/174.4 |
| 5,004,761 | * 4/1991 | Yada et al. | 264/216 |

FOREIGN PATENT DOCUMENTS 0 280 541 A2    8/1988 (EP) .

* cited by examiner

Primary Examiner—Leo B. Tentoni
(74) Attorney, Agent, or Firm—Fish & Richardson P.C.

(57) ABSTRACT

A method for the continuous production of a shaped hydrogel of absorbent resin is disclosed. This invention accomplishes the continuous production by continuously supplying in the form of a layer a monomer mixture capable of forming an absorbent resin by polymerization and polymerizing the layer of the monomer mixture. This method is characterized by retaining the rate of change of the thickness in the direction of width of the layer of hydrogel of absorbent resin at the time of formation of gel at a level of not more than 20%. The method is advantageously carried out by the use of an apparatus for the production of a shaped hydrogel of absorbent resin which comprises a movable endless revolving support belt, a monomer mixture supplying device, and a device for discharging the shaped hydrogel of absorbent resin, the apparatus preferably being provided near each of the opposite lateral parts of the movable endless revolving support belt with a lateral weir adapted to move in concert with the belt or being provided near each of the opposite lateral parts of the movable endless revolving support belt with a lateral weir fixed in such a manner as to contact the belt in a sliding state. The method of this invention permits production of a shaped hydrogel of absorbent resin intended to afford an absorbent resin which exhibits high absorption capacity, little water-soluble content and little residual monomer only in small amounts, and enjoys a high productivity rate.

24 Claims, 14 Drawing Sheets

METHOD FOR PRODUCTION OF SHAPED HYDROGEL OF ABSORBENT RESIN

BACKGROUND OF THE INVENTION

1. Field of the Invention

This invention relates to a method for the production of a shaped hydrogel of absorbent resin and an apparatus for this production. More particularly, this invention relates to a method for the production of a shaped hydrogel of absorbent resin intended for the manufacture of an absorbent resin which exhibits high absorption capacity, little water-soluble content and little residual monomer , and enjoys high productivity.

2. Description of Related Art

In recent years, absorbent resins which are capable of absorbing some ten to some hundred times their own weights of water have been developed. Various absorbent resins have been finding utility in applications requiring absorption of water and retention of water as in the field of agriculture and horticulture, the field of fresh foodstuffs, and the field of industrial materials necessitating prevention of moisture condensation and heat insulation as well as the field of such sanitary materials as sanitary napkins and disposable diapers.

The absorbent resins of this class known to the public include a hydrolyzed starch-acrylonitrile graft polymer (JP-B-49-43,395), a neutralized starch-acrylic acid graft polymer (JP-A-51-125,468), a saponified vinyl acetate-acrylic ester copolymer (JP-A-52-14,689), a hydrolyzed acrylonitrile copolymer or acrylamide copolymer (JP-B53-15,959), products of cross-linkage thereof, a self-cross-linking sodium polyacrylate obtained by reversed-phase suspension polymerization (JP-A-53-46,389), and a cross-linked partially neutralized polyacrylic acid (JPA-55-48,304), for example.

Heretofore, the techniques represented by the aqueous solution polymerization have been known as methods for the production of an absorbent resin. As concrete examples of the techniques, a method which consists in subjecting the aqueous solution of a hydrophilic vinyl type monomer to adiabatic polymerization in a specific vessel (as published in JP-A-55-108,407, for example) and a method which consists in polymerizing a polymer gel while cutting it by agitation in a twin-arm kneader (as published in JP-A-57-34,101, for example) may be cited.

In the domain which resorts to the principle of applying a liquid reactant component in the form of a layer, at least 1 cm in thickness, on a movable endless revolving support belt and polymerizing the superposed layer, a method and apparatus for the continuous production of a polymer and a copolymer from a water-soluble monomer, characterized by introducing the liquid reactant component into a recess continuously formed from the support belt and, while the polymerization of the reactant component is in process, continuously transforming the recess of the support belt into an elongate flat belt, and continuously separating the formed polymer ribbon gel from the lateral end part toward the center of the recess formed of the support belt during the transformation of the recess formed by bending the support belt to the elongate flat belt has been proposed (JP-A62-156,102).

When the apparatus of this operating principle is adopted for a shaped hydrogel of absorbent resin intended to afford an absorbent resin, however, since the recess assumes a cross section of the shape of a bowl, the supplied liquid monomer mixture and the formed a shaped hydrogel of absorbent resin both assume a cross section of the shape of a bowl and induce a difference in thickness between the central part and the opposite edge parts, with the adverse result that the speed of cooling from the lower side will vary and the absorbent resin of uniform quality will be obtained only with difficulty.

An object of this invention, therefore, is to provide a method for the production of a shaped hydrogel of absorbent resin intended to afford an absorbent resin of uniform quality.

Another object of this invention is to provide a method for the production of a shaped hydrogel of absorbent resin intended to afford an absorbent resin which exhibits high absorption capacity, little water-soluble content and little residual monomer and enjoys high productivity.

SUMMARY OF THE INVENTION

The objects mentioned above are accomplished by the following items (1)–(9).

(1) A method for continuously producing a shaped hydrogel of absorbent resin by continuously supplying in the form of a layer a monomer mixture capable of forming an absorbent resin by polymerization and polymerizing said layer of said monomer mixture, characterized by retaining the rate of change of the thickness in the direction of width of said layer of shaped hydrogel of absorbent resin at the time of formation of gel at a level of not more than 20%.

(2) A method set forth in (1) mentioned above, which is implemented by the use of an apparatus for production of a shaped hydrogel of absorbent resin, comprising a movable endless revolving support belt, a monomer mixture supplying device, and a device for discharging a shaped hydrogel of absorbent resin.

(3) A method set forth in (2) mentioned above, wherein said apparatus for production is provided near each of the opposite lateral parts of said movable endless revolving support belt with a lateral weir adapted to move in concert with said belt.

(4) A method set forth in (2) mentioned above, wherein said apparatus for production is provided near each of the opposite lateral parts of said movable endless revolving support belt with a lateral weir fixed so as to contact said belt in a sliding manner.

(5) A method set forth in (2) mentioned above, wherein said apparatus for production is provided with an open-close tack weir disposed on the downstream side of said movable endless revolving support belt relative to said monomer mixture supplying device in a direction nearly perpendicular to the direction of travel of said belt in such a manner as to contact said belt in a sliding state.

(6) A method set forth in (2) mentioned above, wherein said apparatus for production is provided with a terminal weir disposed on the upstream side of said movable endless revolving support belt relative to said monomer mixture supplying device in a direction nearly perpendicular to the direction of travel of said belt in such a manner as to contact said belt in a sliding state.

(7) A method set forth in (2) mentioned above, wherein said movable endless revolving support belt forms near said monomer mixture supplying device an inclination descending toward the downstream of said belt in the direction of travel of said belt.

(8) A method set forth in (2) mentioned above, wherein said movable endless revolving support belt is possessed of a cooling and/or heating surface.

(9) A method set forth in (2) mentioned above, wherein said method is carried out under an atmosphere of an inert gas.

DETAILED DESCRIPTION OF THE INVENTION

Figure 1:
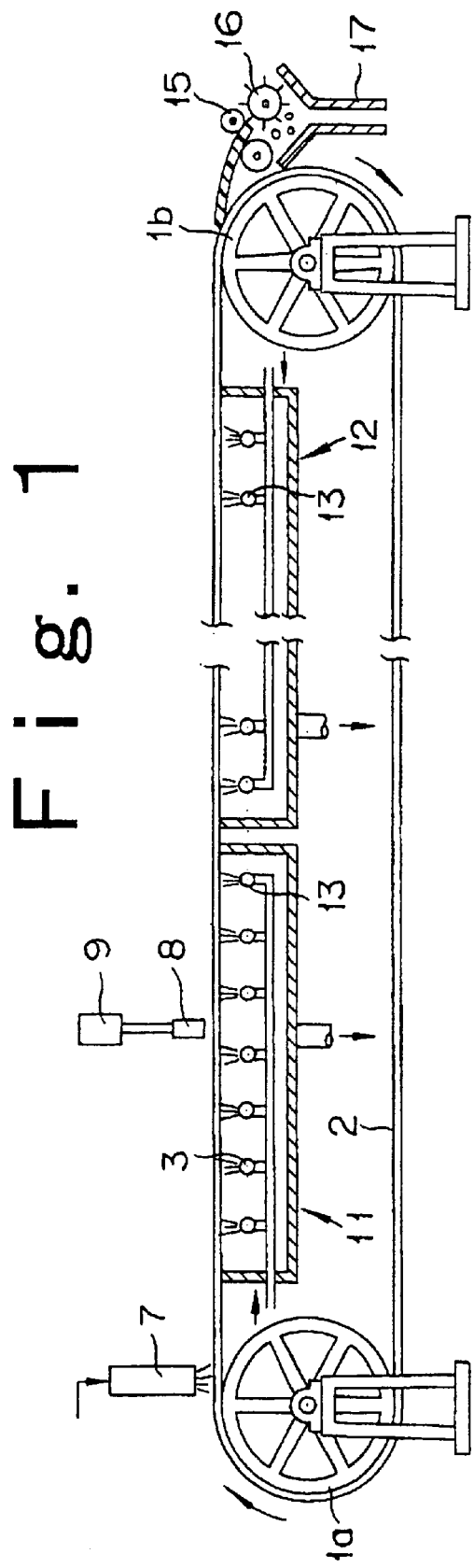
FIG. 1 is a schematic diagram illustrating one embodiment of the apparatus for production to be used in the method for production of a shaped hydrogel of absorbent resin according to this invention.

The method for production of a shaped hydrogel of absorbent resin according to this invention resides in continuously producing a shaped hydrogel of absorbent resin by continuously supplying in the form of a layer a monomer mixture capable of forming an absorbent resin by polymerization and polymerizing the layer of the monomer mixture, which method is characterized by retaining the rate of change of the thickness in the direction of width of the layer of hydrogel of absorbent resin at the time of formation of gel at a level of not more than 20%.

The expression "the time of formation of gel" as used herein means the time at which the polymerization system has ceased to possess flowability and acquired a state capable of assuming a fixed shape and the term "polymerization system" refers to the monomer mixture and/or the shaped hydrogel of absorbent resin. The term "shaped hydrogel of absorbent resin" as used in the present invention refers to the shaped hydrogel which is obtained by polymerizing through the agency of a polymerization initiator a monomer mixture destined to transform through polymerization into an absorbent resin.

The term "direction of width" as used herein refers to the direction which is perpendicular to the direction of advance of the shaped hydrogel of absorbent resin during the course of the continuous polymerization. The terms "change of the thickness," "rate of change of the thickness," and "average thickness" are used on the basis of the following definitions.

[Change of the thickness]

This attribute is determined by measuring the thickness in the direction of width of a given layer of shaped hydrogel of absorbent resin at the time of formation of gel at 20 points regularly-interval. , taking the largest of 20 measurements as "maximum thickness and the smallest thereof as "minimum thickness," and calculating the following formula using the maximum and the minimum thickness.

Change of the thickness (mm)=Maximum thickness Minimum–thickness

[Rate of change of the thickness]

This attribute is determined by calculating the following formula using the change of the thickness mentioned above.

Rate of change of the thickness (%)=(Change of the thickness/Maximum thickness)×100

[Average thickness]

This attribute is determined by calculating the following formula using the maximum thickness and the minimum thickness mentioned above.

Average thickness (mm)=(Maximum thickness+Minimum thickness)/2

While the rate of change of the thickness in the direction of width of the layer of the hydrogel of absorbent resin must be retained at a level of not more than 20%, it is preferred to be not more than 10%. If the rate of change exceeds 20%, the production of an absorbent resin of uniform quality which forms one of the objects of this invention will be attained only with difficulty because of the possibility that the cooling or heating of the layer from below the reaction vessel or the radiation of heat from above the reaction layer will proceed unevenly.

The change of the thickness of the shaped hydrogel of absorbent resin is not more than 5 mm, preferably not more than 3 mm. If the change of the thickness exceeds 5 mm, the production of an absorbent resin of uniform quality which forms one of the objects of this invention will be attained only with difficulty because the amount of the heat of polymerization emitted by the reaction of polymerization will vary with the site of polymerization.

The average thickness of the layer of the hydrogel of absorbent resin preferably exceeds 20 mm and more preferably falls in the range of 20–50 mm. If the average thickness is less than 20 mm, the possibility that the rate of polymerization will not be heightened and the amount of the residual monomer will be increased, though depending on the monomer concentration, and the possibility that the polymerization time will be so long and the amount of the monomer mixture so small as to degrade the productivity may rise.

Conversely, if the average thickness of the layer of hydrogel of absorbent resin exceeds 50 mm, the possibility that the removal of heat will not be attained satisfactorily, depending on the monomer concentration, and consequently the peak temperature will rise and the amount of water-soluble content will increase may arise.

The reaction of polymerization is performed by the use of an apparatus for the production of a shaped hydrogel of absorbent resin which comprises a movable endless revolving support belt, a monomer mixture supplying device, and a device for discharging the shaped hydrogel of absorbent resin.

The apparatus to be used for the purpose of this reaction of polymerization is an apparatus for the production of a shaped hydrogel of absorbent resin which comprises a movable endless revolving support belt, a monomer mixture supplying device, and a device for the discharge of the shaped hydrogel of absorbent resin, for example. This apparatus for the production of the shaped hydrogel of absorbent resin exhibits such horizontally as to allow the rate of change in the thickness in the direction of width of the shaped hydrogel of absorbent resin to be retained at a level of not more than 20% at the time of formation of the gel and possesses near each of the opposite lateral parts of the movable endless revolving support belt a lateral weir adapted to move in concert with the belt.

Figure 2:
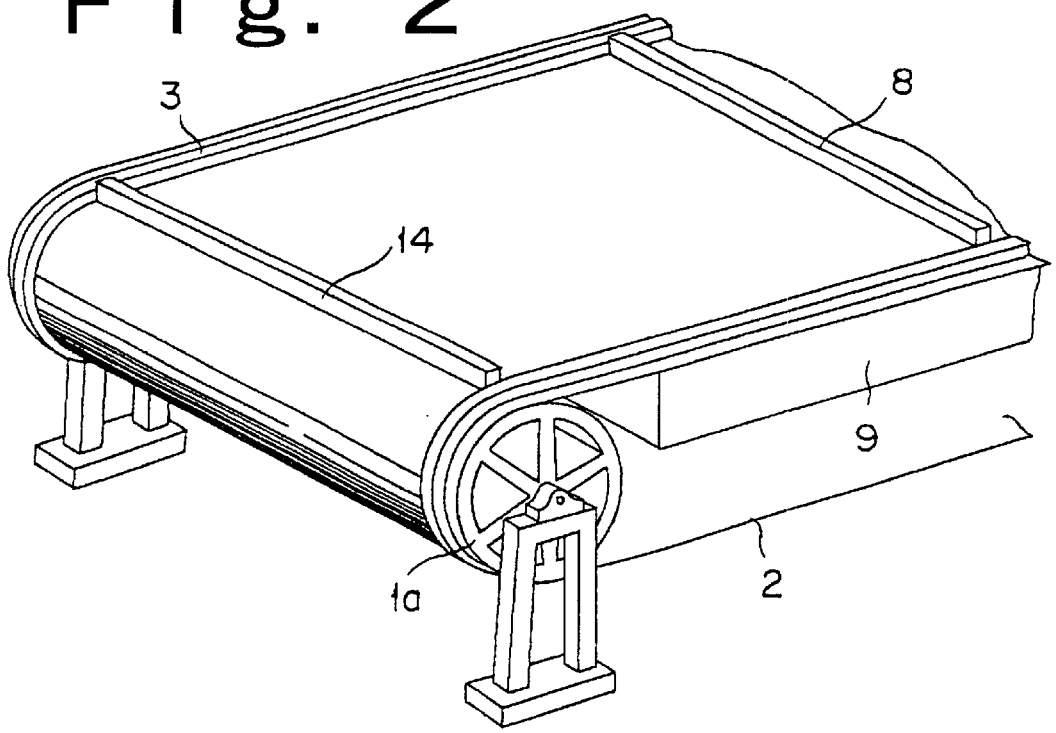
FIG. 2 is a perspective view illustrating the essential part of the apparatus shown in FIG. 1.

FIG. 1 is a schematic diagram of the apparatus for the production under discussion and FIG. 2 is a perspective view schematically illustrating the movable parts of the apparatus.

Specifically, as illustrated in FIGS. 1 and 2, the apparatus for the production is composed of a rotor $1a$ connected, when necessary through the medium of a speed regulator (not shown), to a power source such as a motor, and a rotor $1b$ provided at the opposite ends, and a movable endless revolving support belt 2 laid taut as passed around the rotors $1a$ and $1b$. The monomer mixture supplying device is disposed at one end and the device for discharging the shaped hydrogel of absorbent resin at the other end respectively of the upper face of the support belt. Near each of the opposite lateral parts of the movable endless revolving support belt 2, a flexible lateral weir 3 adapted to move in concert with the support belt is fixed to the entire periphery of the supporting belt along the direction of travel of the support belt. The term "flexible" as used herein means the degree of deformation which corresponds to the radius of curvature of the rotors $1a$, $1b$ which support the belt 2.

In order for the movable endless revolving support belt 2 to produce the shaped hydrogel of absorbent resin which exhibits high absorption capacity, little water-soluble content and a little residual monomer only in small amounts, it is important that the belt should retain at any point thereof horizontally in the direction of width between the time at which at least the polymerization initiate and the flowability of the polymerization system begins to dwindle in consequence of the start of the formation of the gel and the time at which the gelation begins to proceed and it is essential that the support belt 2 should possess horizontality such that rate of change of the thickness in the direction of width of the layer of hydrogel of absorbent resin at the time at which the monomer mixture supplied onto the support belt 2 is gelated is retained at a level of not more than 20%, preferably not more than 10%. Particularly, the change of the thickness of the layer of the hydrogel of absorbent resin is required to be not more than 5 mm, preferably not more than 3 mm. Specifically, if the rate of change of the thickness mentioned above exceeds 20%, the height of the layer of the liquid monomer mixture from the face of the belt will vary in the direction of width relative to the direction of travel of the belt and, as a result, the amount of the heat of polymerization arising from the reaction of polymerization will vary, depending on the site. This excess has the possibility of rendering difficult the production of a shaped gel of absorbent resin in a uniform quality which forms one of the objects of this invention. The remarks apply to the change of thickness in the direction of width.

Incidentally, the horizontality of the support belt 2 in the direction of travel may consist of an incessant extension from the upstream end part through the downstream end part of the belt in the direction of travel thereof, an upward inclination in the direction of travel of the belt, a downward inclination in the same direction, or a combination thereof.

The flexible lateral weir 3 to be fixed near each of the opposite lateral parts imposes no restriction particularly but requires only to be made of a material possessing flexibility as mentioned above. The means to fix the lateral weir 3 to the belt 2 may be adhesion by the use of an adhesive agent or fixation in the form of insertion or nipping, for example. The material for forming the lateral weir 3 is preferred to possess a coefficient of expansion of not more than 10%, particularly not more than 5%, besides the flexibility. The term "coefficient of expansion" as used herein means the rate of change which a sample piece having a surface area of at least 45 cm$^2$ shows after it has been immersed in the monomer mixture at room temperature (20° C.) for 24 hours, as expressed by the following formula.

Coefficient of expansion (%)=[(Weight (g) after 24 hours)−(original weight (g))]×100/(Original weight (g))

The materials which are suitable for acidic monomer mixtures include synthetic resins such as polyethylene, polypropylene, polyesters, polyamides, fluorine resin, polyvinyl chloride, epoxy resin, silicone resin, polystyrene, ABS resin, polyurethane, phenoxy, polycarbonate, polymethyl methacrylate, polyacetanol, nylon, cellulose, phenol, formaldehyde resin, urea resin, melamine. Formaldehyde resin, furan resin, xylene resin, unsaturated polyester resin, and diallyl phthalate, rubber materials such as natural rubber, isoprene rubber, butadiene rubber, styrene-butadiene rubber, butyl rubber, ethylene-propylene rubber, ethylene-vinyl acetate copolymer, chloropropylene rubber. chlorosulfonated polyethylene, polyethylene chloride, epichlorohydrin rubber, nitrile rubber, nitrile-isoprene rubber, acryl rubber, urethane rubber, polysulfide rubber, silicone rubber, and fluorine rubber, inorganic fillers such as glass, graphite, bronze, and molybdenum disulfide, and the aforementioned synthetic resins reinforced by combination with such organic fillers as polyimide, for example. Among other substances mentioned above, rubbers such as nitrile rubber, silicone rubber, and chloropropylene rubber and fluorine resins such as polyethylene tetrafluoride, polyethylene trifluoride, polyethylene trifluorochloride, ethylene tetrafluorid-ethylene copolymer, propylene pentafluoride-ethylene tetrafluoride copolymer, perfluoroalkyl vinyl ether-ethylene tetrafluoride copolymer, and polyvinyl fluoride prove particularly favorable.

The coefficients of expansion of typical materials are as shown below.

Natural rubber 0.38%
Chloropropylene rubber 0.70%
Silicone 1.92%
Foamed silicone 1.04%

As typical examples of the sectional form of the lateral weir 3, tetragon, triangle, trapezoid, semicircular arch, cycle, ellipse, and combinations thereof may be cited. They further include a hollow form and a concave groove. In consideration of the efficiency of cooling of the layer of monomer mixture which is subjected to the reaction of polymerization, the proper height of the lateral weir 3 is in the range of 10–70 mm, preferably in the range of 30–60 mm. If the height of the lateral weir 3 is less than 10 mm, the height of the layer of the liquid monomer mixture to be supplied will be naturally less than the insufficient height of the lateral weir and consequently the productivity of the shaped hydrogel of absorbent resin will be degraded. Conversely, if the height exceeds 70 mm, though the amount of the liquid monomer mixture to be supplied may be increased, the excess of height will impair the thermal conductivity, compel the formed hydrogel to induce a sort of internally adiabatic polymerization, and render difficult the impartation of necessary flexibility to the material of the lateral weir 3 proportionately to the increase of the height of the lateral weir.

Figure 3:
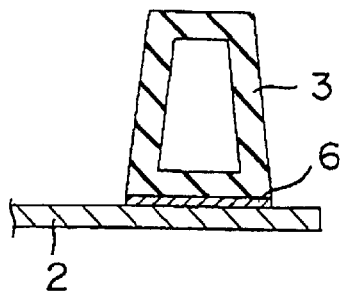
FIG. 3 is a cross section illustrating one embodiment of the lateral weir in the apparatus for production to be used in the method for production of a shaped hydrogel of absorbent resin according to this invention.
Figure 4:
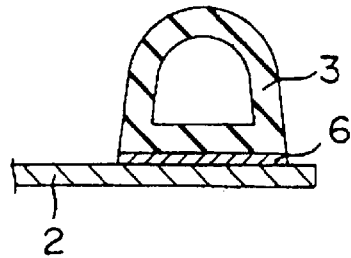
FIG. 4 is a cross section illustrating another embodiment of the lateral weir in the apparatus for production to be used in the method for production of a shaped hydrogel of absorbent resin according to this invention.
Figure 5:
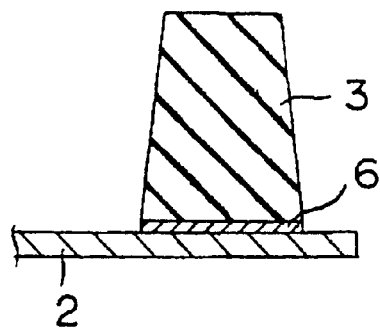
FIG. 5 is a cross section illustrating yet another embodiment of the lateral weir in the apparatus for production to be used in the method for production of a shaped hydrogel of absorbent resin according to this invention.

As illustrated in FIG. 3 and FIG. 4, lateral weirs 3 of a sectional form like a hollow trapezoid or lateral weirs 3 of a sectional form like a hollow semicircular arch are fixed to the surface of the belt 2 through the medium of a layer of adhesive agent 6. Further, as illustrated in FIG. 5, lateral weirs 3 of a sectional form like a solid tetragon are fixed to the surface of the belt 2 through the medium of the layer of adhesive agent 6.

Figure 6:
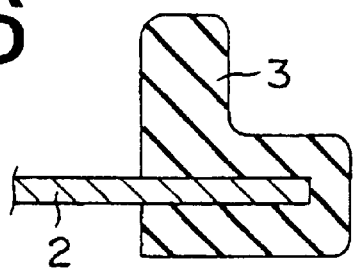
FIG. 6 is a cross section illustrating still another embodiment of the lateral weir in the apparatus for production to be used in the method for production of a shaped hydrogel of absorbent resin according to this invention.

When the opposite terminal parts of the belt 2 are each inserted in a nipped state into a slit formed in the bottom part of the lateral weirs 3 shaped like the letter L as illustrated in FIG. 6, the weir 3 can be fixed to the belt 6 without requiring the invention of the layer of adhesive agent. Of course, in this case, the fixation may be enhanced through the medium of the layer of adhesive agent.

The support belt 2 which is made of a corrosion-resistant material or a durable material may be effectively used herein. A sheet made of stainless steel may be cited, for example.

In the apparatus for production mentioned above, a monomer mixture supplying device 7 is disposed near the upstream end part of the support belt 2 in the direction of travel of the belt. By this monomer mixture supplying device 7, the liquid monomer mixture of such monomers as are destined to form absorbent resin through polymerization is supplied onto the support belt 2.

Since the monomer mixture supplied onto the support belt is a liquid, an open-close tack weir 8 is disposed in the downstream side of the monomer mixture supplying device in the direction of travel of the support belt 2 in a direction nearly perpendicular to the direction of the travel in such a manner as to contact the support belt 2 in a sliding state for the purpose of preventing the liquid monomer mixture from flowing downstream in the direction of travel at the time that the continuous production is started. When the supplied liquid monomer mixture begins to gelate, the travel of the polymerization system on the belt 2 is enabled by raising the tack weir 8 by the use of a hydropneumatic cylinder 9 such as, for example, a hydraulic cylinder or a pneumatic cylinder. Once the leading end of the monomer mixture has begun gelation, the gelated part serves as a weir and renders the use of the tack weir 8 no longer necessary. Further, the presence of the tack weir 8 results in obstructing the travel of the monomer mixture.

Figure 7:
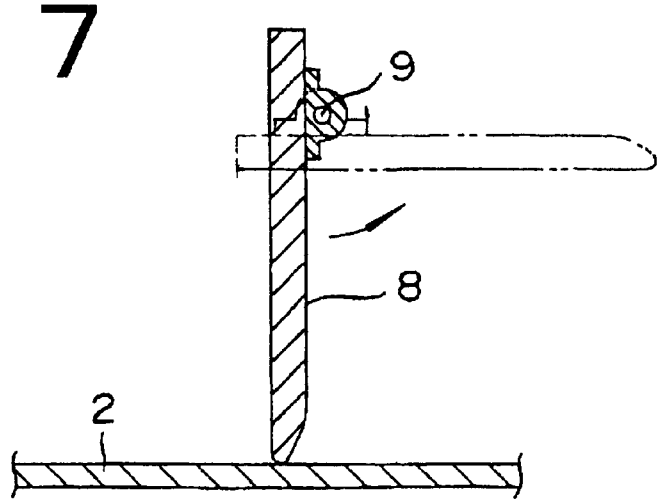
FIG. 7 is a cross section illustrating one embodiment of the tack weir in the apparatus for production to be used in the method for production of a shaped hydrogel of absorbent resin according to this invention.

This tack weir 8, as illustrated in FIG. 7, for example, is pivotally tacked to a rotating shaft 9 as illustrated in FIG. 7. After the monomer mixture has begun gelation, this tack weir 8 may be revolved either manually or mechanically to be relieved of the tacked state. This tack weir 8, when necessary, may be of the form of a lift roller (not shown) capable of contacting the support belt 2.

To the lower side of the belt 2, a cooling device 11 and a heating device 12 may be attached, as occasion demands. The heating device 12 is adapted to effect direct heating by the supply of a heat medium such as hot water, by the use of an electric heater, or by the exposure of a far infrared ray.

The cooling device 11 is adapted to spout water or other refrigerant to the lower face of the belt 2 through a spouting tube 13.

This invention prefers the belt to be possessed of a cooling or heating surface as described above. Preferably, the cooling or heating surface is adapted to contact directly the monomer mixture. If the belt lacks the cooling or heating surface, the possibility of incurring difficulty in controlling the heat of polymerization of the shaped hydrogel of absorbent resin controlled may arise. If a substance inhibiting transfer of heat intervenes between the monomer mixture and the cooling or heating surface of the belt, the possibility of rendering difficult the control of the heat of polymerization of the shaped hydrogel of absorbent resin will likewise ensue.

Near the monomer mixture supplying device of the support belt 2, a terminal weir 14 is disposed in the upstream of the direction of travel relative to the monomer mixture supplying device nearly perpendicularly to the direction of travel of the support belt 2 in such a manner as to contact the support belt in a sliding state. This terminal weir 14 is intended to prevent the liquid monomer mixture from flowing out into the upstream in the direction of travel and overflowing the support belt 2.

Figure 8:
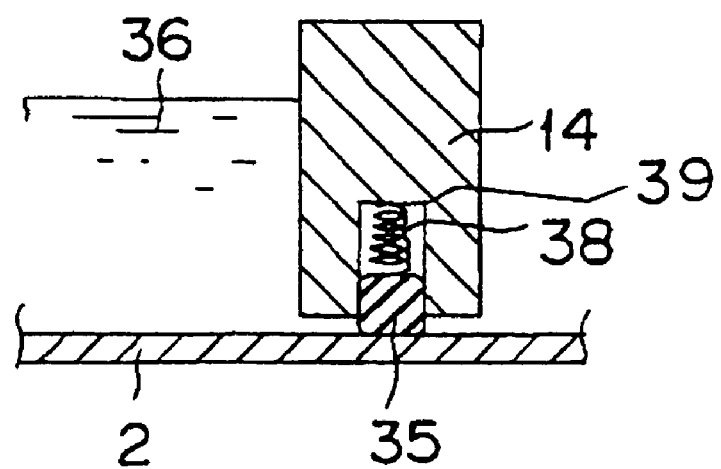
FIG. 8 is a cross section illustrating one embodiment of the terminal weir in the apparatus for production to be used in the method for production of a shaped hydrogel of absorbent resin according to this invention.

Further, in the sectional form of the terminal weir 3, at least one ribbon-like sliding member 35 made of a material such as fluorine resin which possesses a small friction coefficient and exhibiting resistance to wear is slidably formed on the face of the belt 2, the sliding member 35 is inserted into at least one continuous groove 39 formed on the terminal weir proper 14 as opposed to the sliding member 35, and a buffer member 38 is inserted in the groove 39 as interposed between the sliding member 35 and the terminal weir proper 14 as illustrated in FIG. 8. As concrete examples of the buffer member 38, a spring, a rubber elastomer, a rubbery tube passing a stream of fluid such as air water or oil, and a rubber tube packed with an absorbent resin or oil-absorbing substance and swelled by absorbing water or oil may be cited. Optionally, a continuous cavity (not shown) may be bored in the terminal weir proper 14 and adapted to pass a stream of brine or other heating or cooling medium therein.

The terminal weir may be in the form of a roller (not shown) which is adapted to rotate by virtue of direct contact with the belt. The adoption of this roller as the terminal weir results in harnessing the slide to diminish the frictional resistance exerted on the belt.

The substance for the sliding member is the same as that for the lateral weir mentioned above. This substance is preferred to have a coefficient of expansion of not more than 10%, especially not more than 5%. The concrete examples of this substance are the same as those of the substance for the lateral weir.

Figure 9:
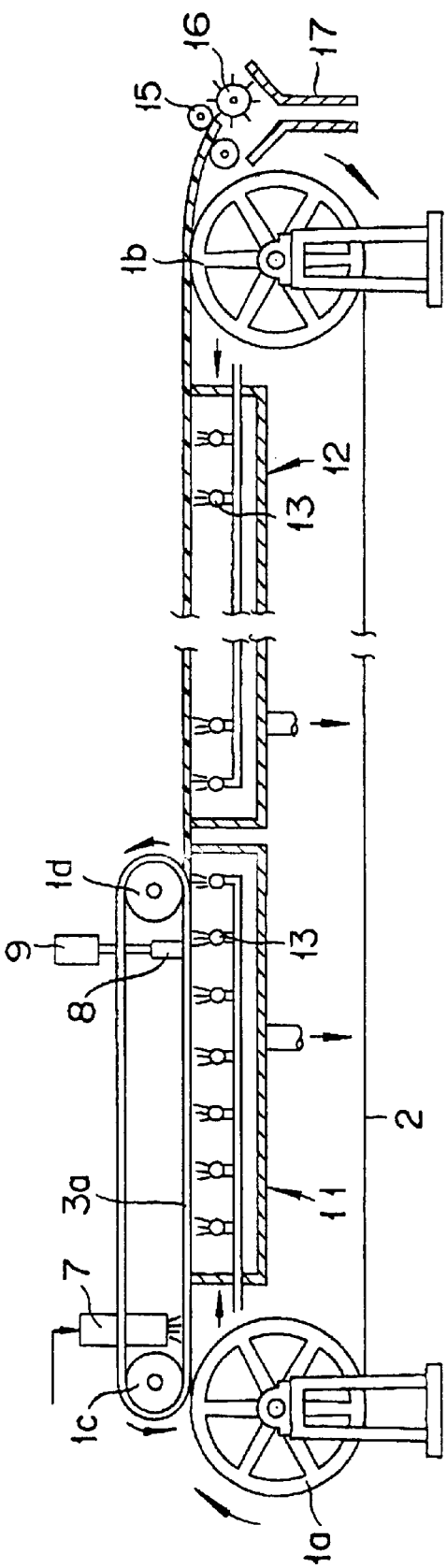
FIG. 9 is a schematic diagram illustrating another embodiment of the apparatus for production to be used in the method for production of a shaped hydrogel of absorbent resin according to this invention.
Figure 10:
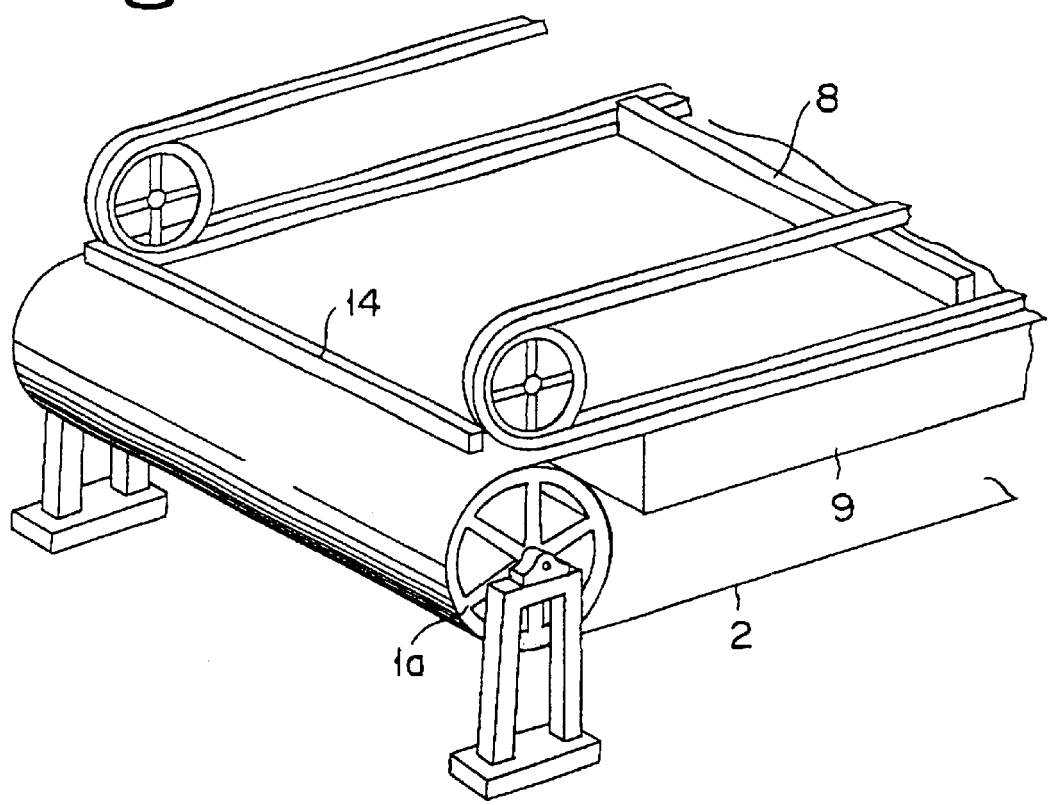
FIG. 10 is a perspective view illustrating the essential part of the apparatus shown in FIG. 9.

As shown in FIG. 9 and FIG. 10, in the apparatus for production mentioned above, another embodiment of the lateral weir 3 is adapted not to be fixed to the support belt but to be moved in a state keeping contact with the belt 2. The range in which a lateral weir 3a of this form is to be disposed is at least from the upstream side of the monomer mixture supplying device in the direction of travel of the monomer mixture to the position terminating one-tenth of the length from the monomer mixture supplying device to the device for discharging the shaped hydrogel of absorbent resin. Of course, there is absolutely no reason for excluding the form of disposing the lateral weir throughout the entire area ranging from the monomer mixture supplying device to the device for discharging the shaped hydrogel of absorbent resin. Solely for the purpose of producing an absorbent resin of uniform quality, the range up to the position terminating one-tenth of the length mentioned above suffices. The lateral weir of the form not fixed to the belt but allowed to move in a state keeping contact with the belt is preferred to be a movable endless revolving lateral weir 3a which is supported by a rotor 1c and a rotor id adapted to rotate in a direction opposite the direction of the movable endless revolving support belt 2. In FIG. 9 and FIG. 10, like reference numerals found in FIG. 1 denote like component members.

Figure 11:
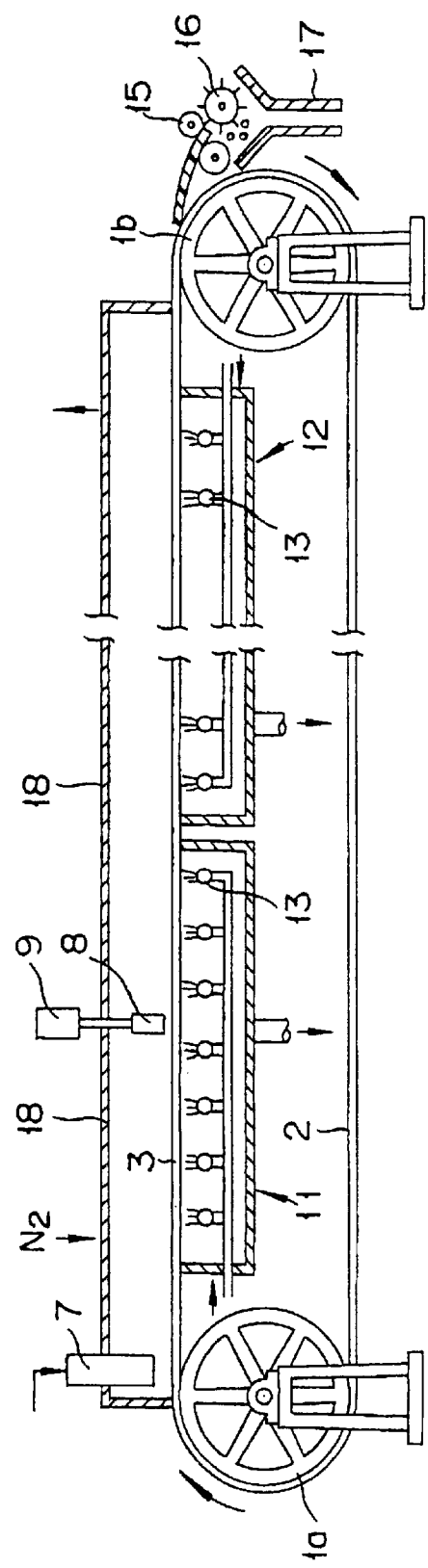
FIG. 11 is a schematic diagram illustrating yet another embodiment of the apparatus for production to be used in the method for production of a shaped hydrogel of absorbent resin according to this invention.

A lid 18 may be set in place above the support belt 2 as illustrated in FIG. 11 so as to seal the entire reaction zone overlying the belt 2 with such an inert gas as nitrogen, for example.

The device for discharging the shaped hydrogel of absorbent resin is disposed to the front of the rotor 1b in the downstream terminal part in the direction of travel of the support belt 2, i.e. near the discharge edge of said support belt 2. This discharge device is provided with a scraping device 15 for discharging the formed shaped hydrogel of absorbent resin and, when necessary, further with a crushing device 16. The shaped hydrogel of absorbent resin thus scraped is crushed and then recovered such as with a hopper 17. The discharge device may be adapted to discharge the shaped hydrogel of absorbent resin as produced instead of being provided with the scraping device or the crushing device as illustrated.

Figure 12:
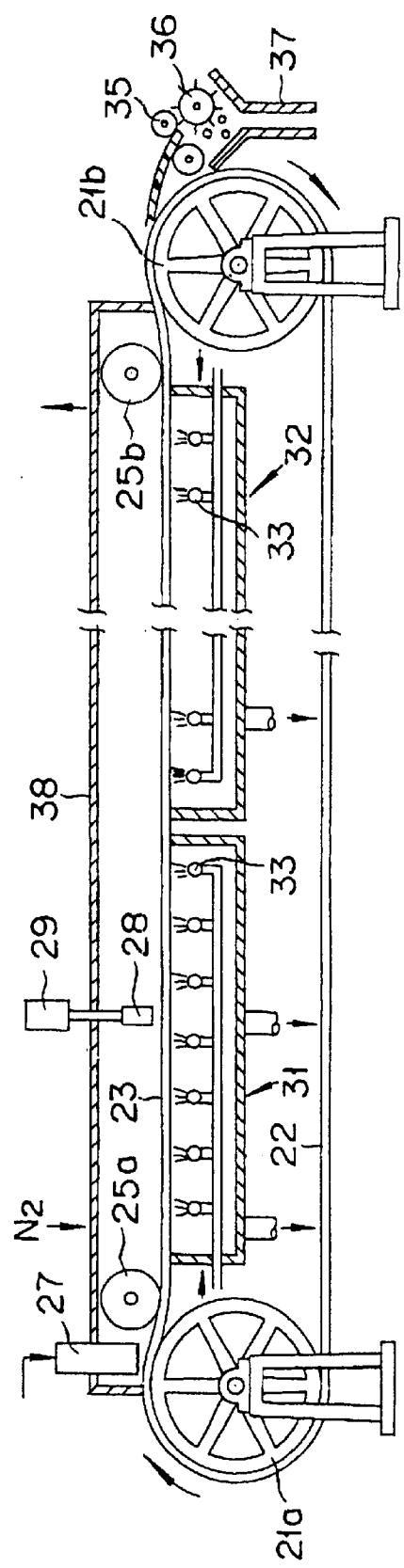
FIG. 12 is a schematic diagram illustrating still another embodiment of the apparatus for production to be used in the method for production of a shaped hydrogel of absorbent resin according to this invention.
Figure 13:
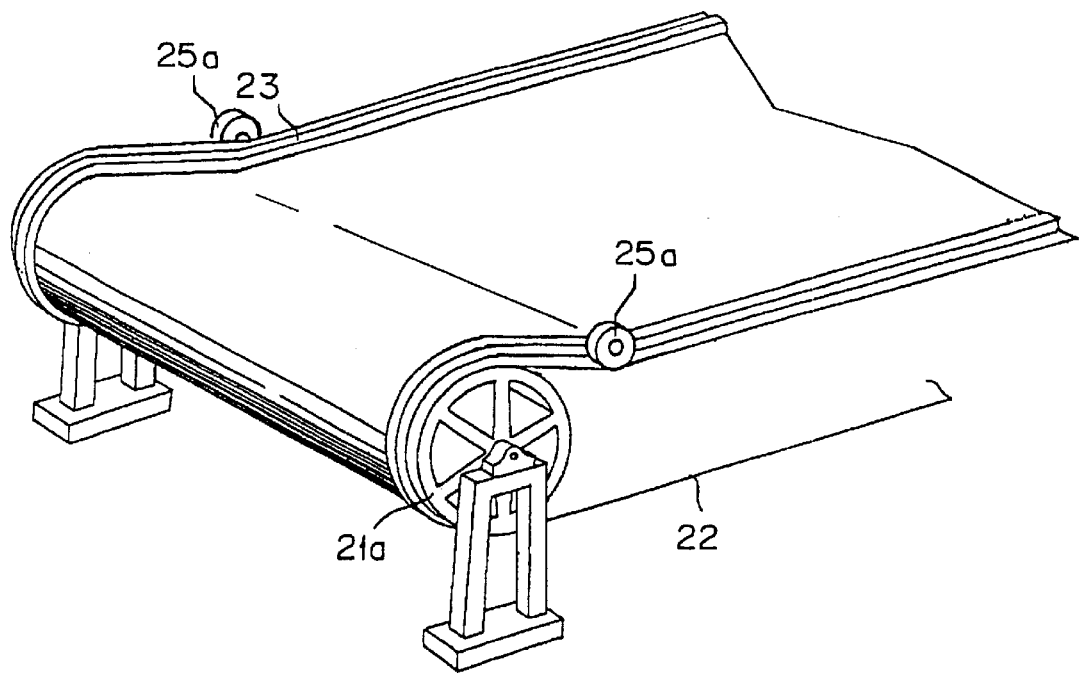
FIG. 13 is a perspective view illustrating the essential part of the apparatus shown in FIG. 12.
Figure 14:
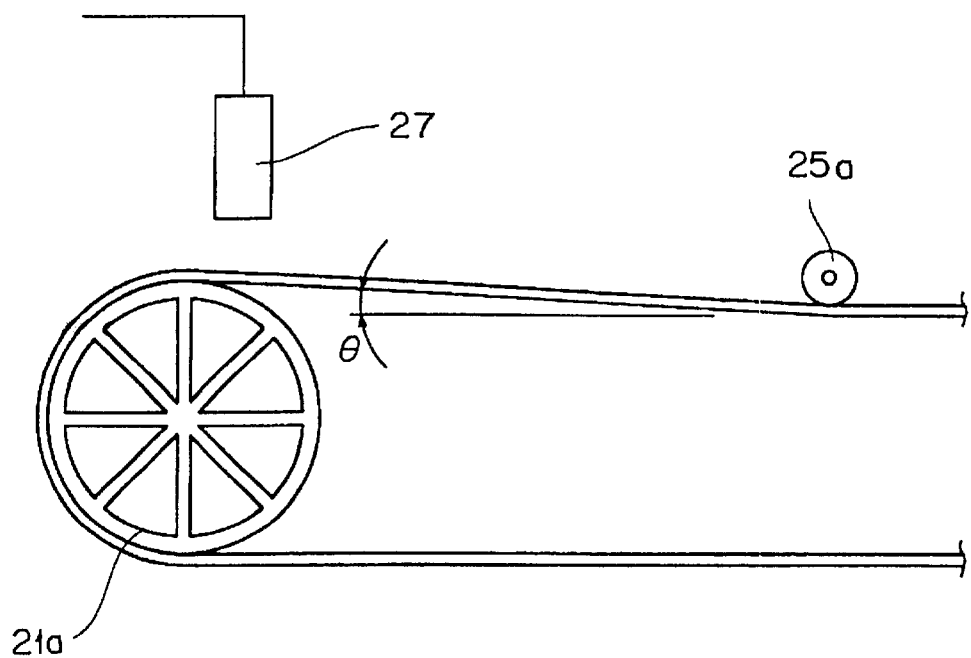
FIG. 14 is a conceptual diagram illustrating the essential part of the apparatus shown in FIG. 12.

FIGS. 12 and 13 depicts another mode of embodying the apparatus for production mentioned above. As illustrated in the diagram, the apparatus of this mode comprises a rotor 21a and a rotor 21b connected, when necessary through the medium of a speed regulator (not shown), to the opposite ends of a power source such as a motor (not shown), a movable endless revolving support belt 22 laid taut as passed around the rotors 21a and 21b, and a flexible weir 23 fixed throughout the entire periphery along the direction of travel of the support belt near each of the opposite lateral parts of the support belt 22. The belt 22, near the monomer mixture supplying device, is made to form a descending inclination toward the downstream in the direction of travel of the support belt owing to the action of the rotor 21a and the rotor 25a. When the liquid monomer mixture is supplied from a monomer mixture supplying device 27, therefore, the possibility of the monomer mixture still in the liquid state flowing out in the upstream in the direction of travel and overflowing the belt 22 near the monomer mixture supplying device is nil. The angle of inclination, $\theta$, of the support belt 22 formed of the rotor 21a and the rotor 25a as illustrated in FIG. 14 relative to the horizontal plane is in the range of 0.1–45 degrees, preferably 0.5–20 degrees. If this angle of inclination is less than 0.1 degree, the overflow into the upstream in the direction of travel will not be effectively prevented. If the angle exceeds 45 degrees, the excess will bring the disadvantage that the durability of the support belt lowers. This inclination of the support belt 22 is preferred to be formed at least between the upstream in the direction of travel relative to the monomer mixture supplying device and the point at which the polymerization system, i.e. the monomer mixture and/or the shaped hydrogel of absorbent resin is gelated. Incidentally, the inclination of the support belt does not need to be formed solely by the rotor 21a and the rotor 25a. It may be otherwise formed by further introducing a plurality of rotors. Alternatively, it may be formed of a multiple of steps of equal or different angles of inclination.

In FIG. 12 and FIG. 13, the reference numerals which are the sums of the reference numerals found in FIG. 1 plus denote like component parts of FIG. 1.

Another apparatus to be used in the reaction of polymerization contemplated by this invention is an apparatus for the production of a shaped hydrogel of absorbent resin which comprises a movable endless revolving support belt, a monomer mixture supplying device, and a device for discharging the shaped hydrogel of absorbent resin. This apparatus for the production of the shaped hydrogel of absorbent resin exhibits such horizontality as to allow the rate of change in the thickness in the direction of width of the shaped hydrogel of absorbent resin to be retained at a level of not more than 20% at the time of formation of the gel and possesses near each of the opposite lateral parts of the movable endless revolving support belt a lateral weir fixed in such a manner as to contact the belt in a sliding state.

Figure 15:
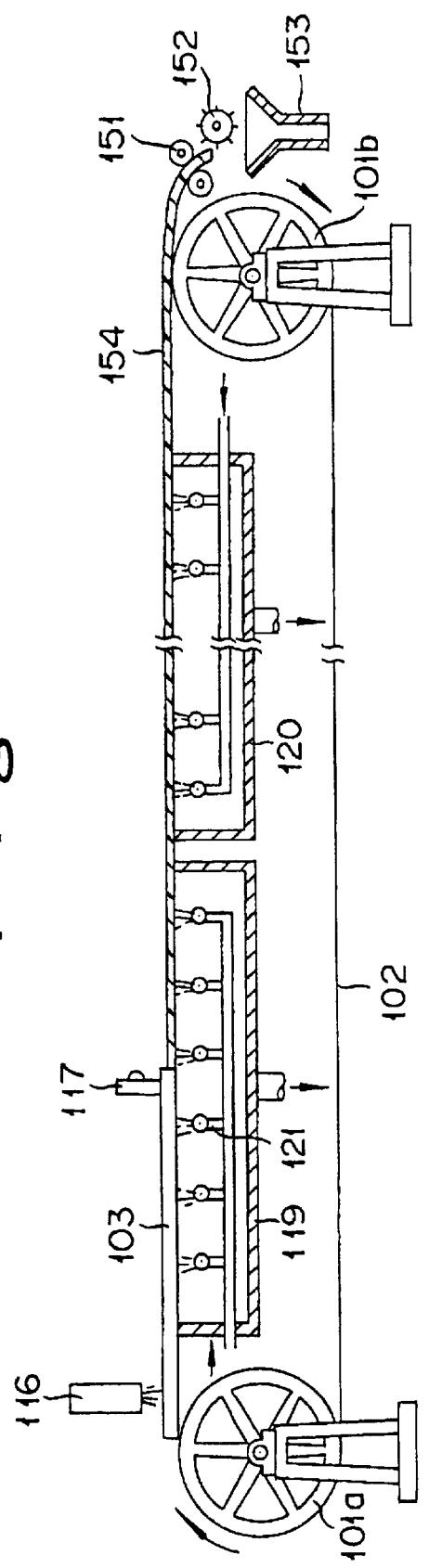
FIG. 15 is a schematic diagram illustrating a further embodiment of the apparatus for production to be used in the method for production of a shaped hydrogel of absorbent resin according to this invention.
Figure 16:
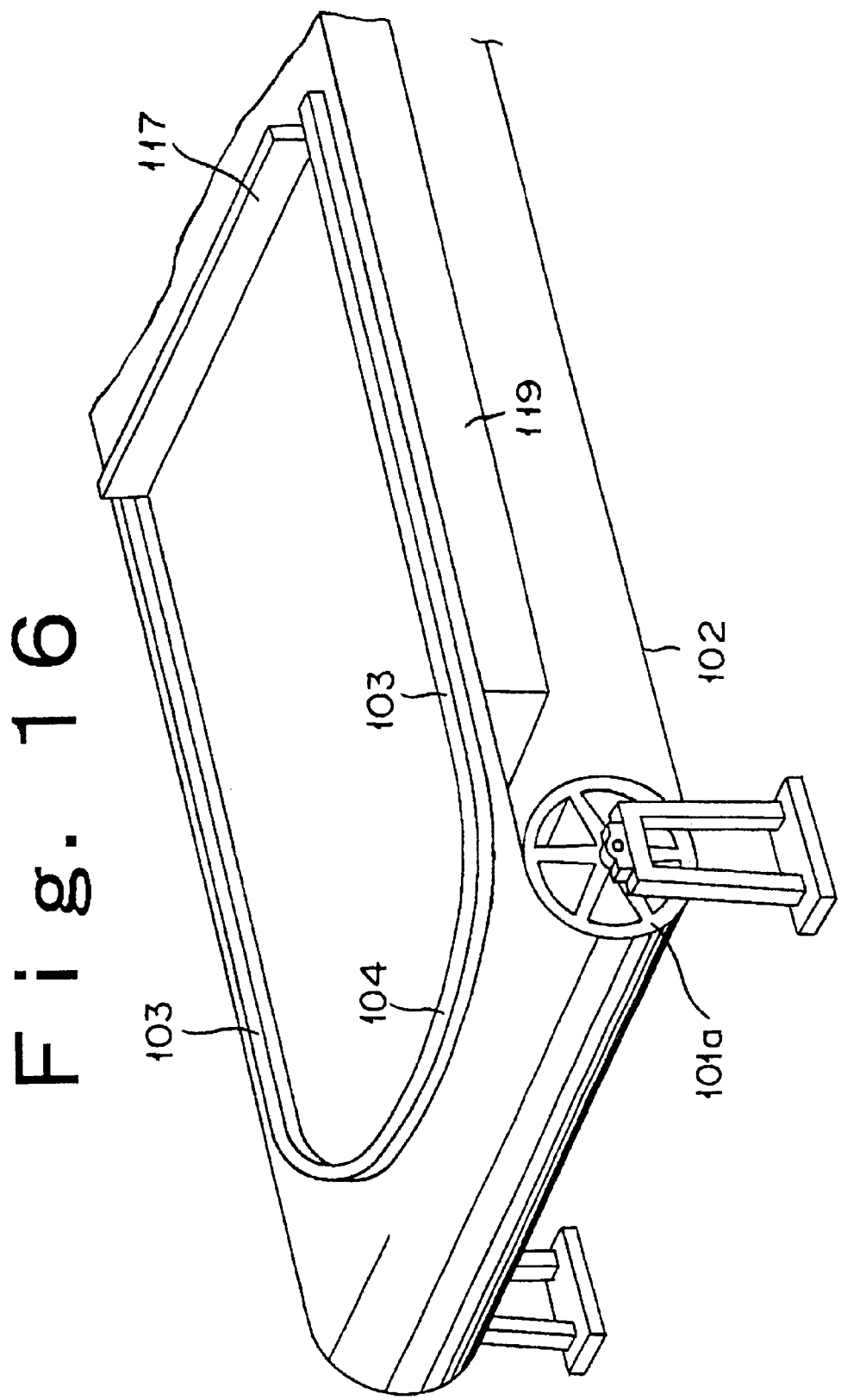
FIG. 16 is a perspective view illustrating the essential part of the apparatus shown in FIG. 14.

FIG. 15 is a schematic diagram of the apparatus for production under discussion and FIG. 16 is a perspective view illustrating schematically the movable parts of the apparatus and also illustrating the lateral weir which contact them in a sliding state.

Specifically, as illustrated in FIGS. 15 and 16, this apparatus is composed of a rotor 101a connected, when necessary through the medium of a speed regulator (not shown), to a power source such as a motor (not shown), an another rotor 101b provided at the opposite ends, a movable endless revolving support belt 102 laid taut as passed around the rotors 101a and 101b, and a lateral weir 103 fixed near each of the opposite lateral parts of the support belt 102 in such a manner as to contact the belt in a sliding state near the monomer mixture supplying device.

The lateral weir 103 is required to be formed at least from the upstream in the direction of travel relative to the monomer mixture supplying device to the point at which the liquid monomer mixture supplied onto the belt 102 begins gelation. It is required to be formed, for example, at least from the upstream in the direction of travel relative to the monomer mixture supplying device to the point terminating one tenth of the length from the monomer mixture supplying device to the device for discharging the shaped hydrogel of absorbent resin. The lateral weir 103, by fulfilling the role of preventing the monomer mixture from flowing out in the direction of width of the belt and, at the same time, retaining constant the thickness of the monomer mixture which is liquid till the gelation, consequently manifests an effect of enabling production of the shaped hydrogel of absorbent resin which exhibits high absorption capacity, little water-soluble content and little residual monomer only in small amounts, and enjoys high productivity.

The monomer mixture which forms the raw material for the shaped hydrogel of absorbent resin is a liquid substance. Though this monomer mixture does not possess a shape of its own, it is converted from a liquid to a gel when it is made to initiate polymerization by incorporation of a polymerization initiator and/or exposure to an active energy ray and the polymerization is allowed to proceed. At the point at which the gelation has thoroughly proceeded, the gel already possesses the ability to retain its shape and is enabled to retain the shape even in the absence of the weir.

Further, in the part of the belt 102 approximating closely to the monomer mixture supplying device, a terminal weir 104 is disposed at the upstream in the direction of travel relative to the monomer mixture supplying device in a direction nearly perpendicular to the direction of travel of the belt 102 in such a manner as to contact the belt 102 in a sliding state for the purpose of preventing the liquid monomer mixture from beginning to flow in the travel direction upstream and overflowing the belt 102. In this case, the terminal weir 104 may be formed separately of the lateral weir 103 mentioned above. Optionally, the terminal weir 104 may be formed integrally with the lateral weir 103 as illustrated in FIG. 16. The integral formation of the terminal weir 104 with the lateral weir 103 proves particularly advantageous because it allays the leakage of the liquid monomer mixture and the inert gas.

Figure 17:
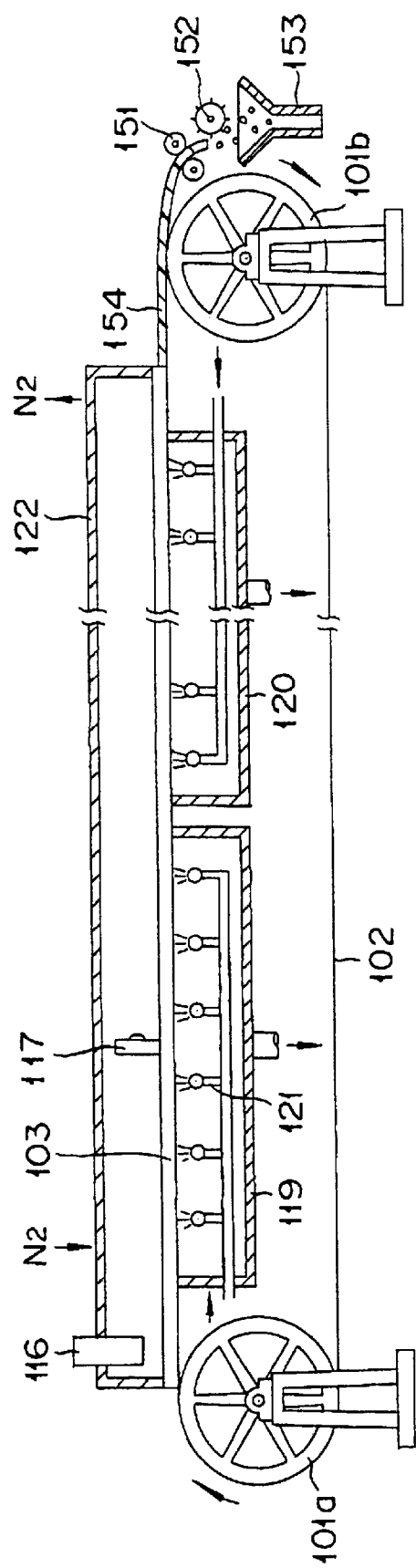
FIG. 17 is a schematic diagram illustrating yet further embodiment of the apparatus for production to be used in the method for production of a shaped hydrogel of absorbent resin according to this invention.

FIG. 17 depicts yet another embodiment of the apparatus for production mentioned above. This embodiment is identical with the apparatus illustrated in FIG. 15 and FIG. 16, excepting that the lateral weir 103 is formed continuously from the neighborhood of the monomer mixture supplying device to the neighborhood of the device for discharging the shaped hydrogel of absorbent resin along each of the opposite lateral parts of the belt in such a manner as to contact the belt in a sliding state.

The face of the lateral weir 103 intended to contact the belt 102 in a sliding state is preferred to use a material which imparts relatively small wear to the material forming the belt 102. It is further preferred to have a coefficient of expansion of not more than 10%, especially not more than 5%. The term "coefficient of expansion" as used herein is based on the definition mentioned above and is specifically as mentioned above.

Figure 18:
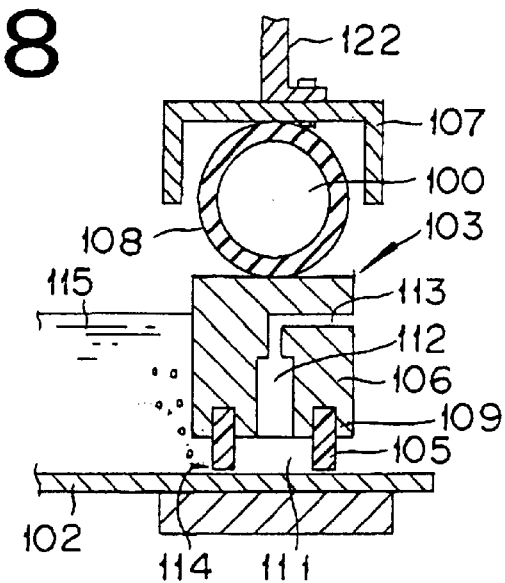
FIG. 18 is a cross section illustrating another embodiment of the lateral weir in the apparatus for production to be used in the method for production of a shaped hydrogel of absorbent resin according to this invention.

The lateral weir 103 possesses such a sectional form as illustrated in FIG. 18, for example. In the lower part thereof, a ribbonlike sliding member 105 made of a material such as fluorine resin which possesses a small friction coefficient and exhibiting resistance to wear is formed so as to contact the face of the belt 102 in a sliding state. This sliding member 105 is retained by a lateral weir proper 106 thereunder. No particular restriction is imposed on the method for effecting this retention. The retention is attained, for example, by inserting the sliding member 105 continuously in at least one continuous groove 109 formed on the lower side of the lateral weir proper 106. A pressing member 107 is disposed above the lateral weir proper 106 and a buffer member 108, when necessary, is interposed between the pressing member 107 and the lateral weir proper 106. In this case, since the belt 102 is destined to travel, the lateral weir 103 may be fixed to the apparatus itself or the lateral weir may be wholly fixed on the floor surface or the building through the medium of a retaining member (not shown).

No particular restriction is imposed on the buffer member 108. Any member capable of producing a buffer action between the pressing member 107 and the lateral weir proper 106. A spring, a member made of plastic or rubber, and a tube are usable as the buffer member. For example, a tube of such a shape as illustrated in FIG. 18 may be made of rubber, fiber-reinforced rubber, or fiber-reinforced plastic, adapted to allow passage of a stream of such a fluid as air, water, or oil therein, or formed by swelling a fluid-absorbing resin such as absorbent resin or oil-absorbing resin with water or oil.

When a plurality of such sliding members 105 are retained, an opening 112 is formed in an empty space 111 intervening between the adjacent sliding members 105, 105, a communicating hole 113 is formed as extended to an inert gas source (not shown), and such an inert gas as nitrogen is supplied to the empty space 111. This inert gas passes a minute joint gap 114 which is formed between the belt 102 and the sliding member 105 and then transfers to a monomer mixture 115 thereby prevents the monomer mixture 115 from leaking out of the weir and, at the same time, passes through the monomer mixture 115 supplied to the space intervening between the belt 102 and the lateral weir 103, transfers to the empty space overlying the monomer mixture 115, and seals the polymerization reaction zone. By passing the inert gas into the empty space 111 mentioned above in the manner just described, the entry of such an active gas as oxygen or air from the ambience into the polymerization reaction zone can be prevented. Optionally, the temperature of the polymerization reaction zone may be regulated by boring a continuous cavity (not shown) inside the lateral weir proper 106 and advancing a stream of brine or other heating or cooling medium into the cavity.

Figure 19:
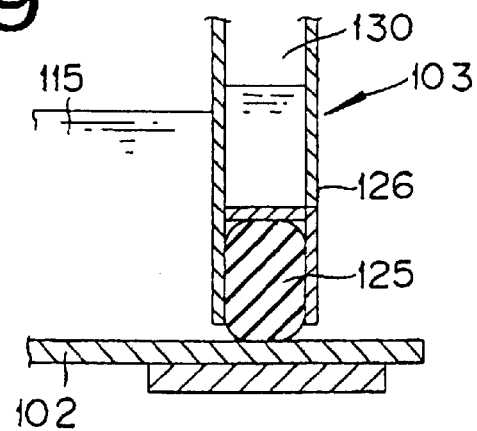
FIG. 19 is a cross section illustrating yet another embodiment of the lateral weir in the apparatus for production to be used in the method for production of a shaped hydrogel of absorbent resin according to this invention.

The sectional form of the lateral weir 103 may be such that a sliding member 125 made of such an elastic material as rubber is set in place in a nipped state below the lateral weir proper 126 as illustrated in FIG. 19 and this sliding member 125 is disposed to contact the belt 102 in a sliding state. In this case, since the belt 102 is destined to travel, the lateral weir 103 itself is fixed to the entirety of the apparatus through the medium of a retaining member (not shown). The lateral weir proper 126 is formed in the shape of the letter H or h for the purpose of nipping the sliding member 125. When the sectional form of the lateral weir proper 126 is in the shape of the latter H, the regulation of the temperature in the polymerization reaction zone of the monomer mixture 115 may be effected by advancing a stream of brine or other heating or cooling medium into an upper empty space 130.

Figure 20:
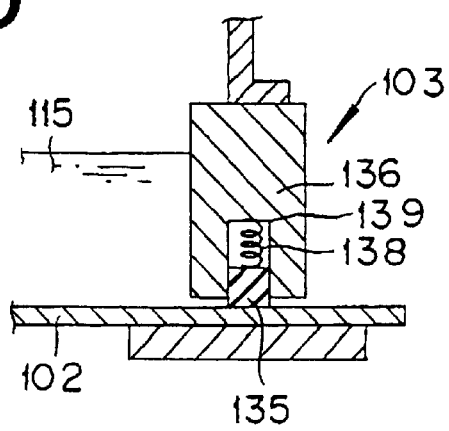
FIG. 20 is a cross section illustrating still another embodiment of the lateral weir in the apparatus for production to be used in the method for production of a shaped hydrogel of absorbent resin according to this invention.

The sectional form of the lateral weir 103 may be such that at least one ribbonlike sliding member 135 made of such a material as fluorine resin which has a small friction coefficient is disposed in such a manner as to contact the face of the belt 102 in a sliding state as illustrated in FIG. 20 and this sliding member 135 is inserted in at least one continuous groove 139 formed in a lateral weir proper 136 opposite the sliding member 135 and a buffer member 138 is interposed in the groove 139 between the sliding member 135 and the lateral weir proper 136.

The buffer member 138 may be a spring, a rubber elastomer, a rubbery tube passing a stream of fluid such as air water or oil, and a rubber tube packed with an absorbent resin or oil-absorbing substance and swelled by absorbing water or oil, for example. In this case, a continuous cavity (not shown) may be bored in the lateral weir proper 136 used for passing a stream of brine or other heating or cooling medium therein.

A lid 122 may be optionally formed above the belt 102 as illustrated in FIG. 17 so as to seal wholly the reaction zone overlying the belt 102 with such an inert gas as nitrogen.

The lid 122 has only to be formed so as to cover wholly the polymerization reaction zone. Optionally, this lid 122 may be fixed to the top of the pressing member 107 as illustrated in FIG. 18 or fixed to the top of the lateral weir proper 126 as illustrated in FIG. 19. This construction may be adopted for the terminal weir. The polymer gel resulting from the polymerization reaction, namely the shaped hydrogel of absorbent resin, is discharged through a slit formed between the lid 122 and the belt 102.

In this invention, for the purpose of retaining the rate of change in the thickness in the direction of width of the shaped hydrogel of absorbent resin verging on gelation at a level of not more than 20%, it is proper to prevent the monomer mixture from billowing at the time of starting gelation by devising the method for supplying the monomer mixture or controlling the induction period. The term "induction period" as used herein means the interval which intervenes between the time the monomer mixture is supplied and the time it begins polymerization. It is preferred to be not less than 0.5 minute and not more than 10 minutes. If the induction period is less than 0.5 minute, the monomer mixture will possible be gelated in a billowing state. Conversely, if the induction period exceeds 10 minutes, the excess will bring such disadvantages as necessitating elongation of the apparatus and degrading the productivity. For the purpose of obtaining the proper induction period, the dissolved oxygen in the monomer mixture is generally preferred to fall in the range of 0.1–4 ppm, especially in the range of 0.5–2 ppm.

The polymerization initiator is mixed suitably with the monomer mixture on the monomer mixture feed line and/or on the belt.

The cooling-heating face is preferred to restrain the temperature difference occurring between the point of supplying the monomer mixture and the point of beginning gelation within ±5° C. It is more preferable to keep the temperature difference of the heating face up to the point at which the shaped hydrogel of absorbent resin reaches the highest temperature (peak temperature) within ±5° C.

Any monomer mixture which is capable of forming absorbent resin can be used in this invention. An unsaturated monomer having a cross-linking agent and a polymerization initiator incorporated therein in small amounts may be cited as one example. It is generally used in the form of an aqueous solution for the polymerization.

As concrete examples of the unsaturated monomer, anionic monomers such as (meth)acrylic acid, (anhydrous) maleic acid, fumaric acid, crotonic acid, itaconic acid, 2-(meth)acryloyl ethane sulfonic acid, 2-(meth)acryloyl propane sulfonic acid, 2-(meth)acrylamide-2-methyl propane sulfonic acid, vinyl sulfonic acid, and styrene sulfonic acid and salts thereof; nonionic hydrophilic group-containing monomers such as (meth)acryl amide, N-substituted (meth) acryl amide, 2-hydroxyethyl (meth)acrylate, 2-hydroxypropyl (meth)acrylate, methoxy polyethylene glycol (meth)acrylate, polyethylene glycol (meth)acrylate, N-vinyl pyrrolidone, and N-vinyl acetamide; and amino group-containing unsaturated monomers such as N,N-dimethylamino ethyl (meth)-acrylate, N,N-dimethylamino propyl (meth)acrylate, and N,N-dimethylamino propyl (meth)acrylate and quaternization products thereof may be cited. Optionally, acrylic esters such as methyl (meth) acrylate, ethyl (meth)acrylate, and butyl (meth)acrylate and hydrophobic monomers such as vinyl acetate and vinyl propionate may be used in an amount incapable of appreciably inhibiting the hydrophilicity of the produced polymer. One or more of these compounds may be selected and used as the monomer component. In consideration of the various absorption properties of the finally produced absorbent material, it is proper to use at least one member selected from the group consisting of (meth)acrylic acid (salt thereof), 2-meth)acryloyl ethane sulfonic acid (salt thereof), 2-(meth)acrylamide-2-methyl propane sulfonic acid (salt thereof, (meth)acrylamide, methoxy polyethylene glycol (meth)acrylate, N,N-dimethylamino ethyl (meth)acrylate, and the quaternization products thereof. The use of a substance containing (meth)acrylic acid (salt thereof) as an essential component proves particularly preferable. In this case, the (meth)acrylic acid having a portion, 30–90 mol %, thereof neutralized with a basic substance proves most favorable. As concrete examples of the cross-linking agent, compounds containing at least two ethylenically unsaturated groups in the molecular unit thereof such as ethylene glycol di(meth)acrylate, diethylene glycol di(meth)acrylate, triethylene glycol di(meth)-acrylate, propylene glycol di(meth) acrylate, polyethylene glycol di(meth)acrylate, trimethylol propane di(meth)acrylate, trimethylol propane tri(meth) acrylate, pentaerythritol di(meth)-acrylate, pentaerythritol tri(meth)acrylate, pentaerythritol tetra(meth)acrylate, N,N'-methylene bis(meth)acrylate, triallyl isocyanurate, trimethylol propane di(meth)allyl ether, triallyl amine, tetraallyloxy ethane, glycerol propoxy triacrylate; polyhydric alcohols such as ethylene glycol, diethyleneglycol, triethyleneglycol, polyethylene glycol, glycerin, polyglycerin, propylene glycol, 1,4-butane diol, 1,5-pentane diol, 1,6-hexane diol, neopentyl alcohol, diethanol amine, tridiethanol amine, polypropylene glycol, polyvinyl alcohol, pentaerythritol, sorbit, sorbitan, glucose, mannit, mannitan, sucrose, and grape sugar; polyglycidyl ethers such as ethylene glycol diglycidyl ether, polyethylene glycol diglycidyl ether, and glycerin triglycidyl ether; haloepoxy compounds such as epichlorohydrin and a-methyl chlorohydrin; polyaldehydes such as glutar aldehyde and glyoxal; polyamines such as ethylene diamine; hydroxides, halogenides, carbonates, and oxides of metals of Groups 2A, 3B, and 8 in the Periodic Table of the Elements such as calcium hydroxide, calcium chloride, calcium carbonate, calcium oxide, magnesium chloroborate, magnesium oxide, aluminum chloride, zinc chloride, and nickel chloride; borates such as borax, and polyvalent metal compounds such as aluminum isopropylate may be cited. Though one member or a mixture of two or more members selected from among the cross-linking agents mentioned above may be used in due consideration of the reactivity, it is most favorable to use a compound containing at least two ethylenically unsaturated groups in the molecular unit thereof as the cross-linking agent.

The amount of the cross-linking agent to be used in this invention is in the range of 0.001–2 parts by weight, preferably 0.005–1 part by weight, based on 100 parts by weight of the unsaturated monomer. If this amount is less than 0.001 part by weight, the shortage will possibly result in an increase in the amount of the water soluble content of the produced absorbent resin. Conversely, if the amount exceeds 2 parts by weight, the excess will possibly heighten the cross-link density excessively and consequently compel the produced absorbent resin to suffer insufficiency of the absorption capacity.

In the method of this invention, the concentration of the total amount of the unsaturated monomer and the cross-linking agent (monomer concentration) relative to the monomer mixture (monomer+water) is in the range of 15–50 wt. %, preferably 25–40 wt. %.

The polymerization of the unsaturated monomer and the cross-linking agent may be performed under a reduced pressure, under a pressure, or under normal pressure, whichever fits the occasion best. It is preferably carried out in the stream of such an inert gas as nitrogen, helium, argon, or carbon dioxide.

As concrete examples of the polymerization initiator, azo compounds such as 2,2'-azobis(2-amidinopropane) dihydrochloride; peroxides such as ammonium persulfate, potassium persulfate, sodium persulfate, hydrogen peroxide, benzoyl peroxide, cumene hydroperoxide, and di-t-butyl peroxide; and redox initiators produced by combining the peroxides mentioned above with such reducing agents as sulfites, bisulfites, thiosulfates, formamidine sulfinic acid, and ascorbic acid may be cited. These radical polymerization initiators may be used either singly or in the form of a mixture of two or more members. Among other radical polymerization initiators, redox type polymerization initiators prove particularly favorable.

Though the amount of the polymerization initiator relative to the total amount of the unsaturated monomer and the cross-linking agent is variable with the combination of the monomer and the radical polymerization initiator, it falls preferably in the range of 0.001–5 parts by weight, more preferably in the range of 0.01–1 part by weight, based on 100 parts by weight of the total amount of the unsaturated monomer and the cross-linking agent. If the amount of the polymerization initiator to be used is less than 0.001 part by weight, the shortage will be at a disadvantage in increasing the amount of the residual monomer in the produced absorbent resin. Conversely, if the amount of the polymerization initiator to be used exceeds 5 parts by weight, the excess will be at a disadvantage in increasing the soluble content in the produced absorbent resin.

Though the temperature at the time of the start of polymerization is variable with the kind of polymerization initiator to be used, it falls preferably in the range of 0–50° C., more preferably in the range of 10–40° C. The temperature of the polymerization in process, though variable with the kind of polymerization initiator to be used, falls preferably in the range of 20–110° C., more preferably in the range of 30–90° C. If the temperature at the start of the polymerization or the temperature of the polymerization in process deviates from the range mentioned above, the deviation will possibly bring such disadvantages as (a) increasing the amount of the residual monomer in the produced absorbent resin, (b) increasing the water-soluble content in the absorbent resin, and (c) suffering the self-crosslinking reaction to proceed excessively to the extent of inducing a decrease in absorption capacity.

The reaction time does not need to be particularly limited but may be suitably set depending on the combination of the monomer mixture and the polymerization initiator or on such reaction conditions as the reaction temperature.

The shaped hydrogel of absorbent resin obtained as described above is crushed, when necessary, and then dried at a prescribed temperature falling in the range of 100–250° C., preferably 150–200° C., for a period in the range of 5 minutes–10 hours, preferably 30 minutes–5 hours, and optionally further pulverized to obtain an absorbent resin.

Now, this invention will be described more specifically below by reference to working examples. It should be noted, however, that this invention is not limited to these examples.

Wherever "parts" is mentioned in the examples, it shall be construed as denoting "parts by weight" unless otherwise specified particularly.

[Absorption capacity]

A given absorbent resin, A (g) (about 0.2 g), uniformly placed in a pouch made of non-woven fabric (60 mm×60 mm), was immersed in artificial urine (0.200% of sodium sulfate, 0.200% of potassium chloride, 0.050% of magnesium chloride hexahydrate, 0.025% of calcium chloride dihydrate, 0.085% of ammonium dihydrogen phosphate, 0.015% of diammonium hydrogen phosphate, and 99.425% of deionized water). After 60 minutes' standing in the artificial urine, the pouch was pulled out, drained with a centrifugal separator at 250 G for three minutes, and weighed to find the weight, W (g). The same pouch containing no absorbent resin was subjected to the same procedure to find the weight, B (g), of the pouch. The ratio of volumetric expansion due to absorption of the sample absorbent resin was calculated in accordance with the following formula using the weights found as described above.

$$\text{Absorption capacity (g/g)} = [W(g) - B(g) - A(g)]/A(g)$$

[Water-soluble content]

A given absorbent resin, C (g) (about 0.5 g), was dispersed in 1000 g of deionized water, stirred therein for one hour, and filtrated with a filter paper. Then, 50 g of the filtrate consequently obtained was placed in a beaker, 100 ml in inner volume, and made to add 1 ml of an aqueous 0.1N sodium hydroxide solution, 10 ml of an aqueous N/200 methyl glycol chitosan solution, and four drops of an aqueous 0.1% toluidine blue solution. Subsequently, the solution in the beaker was subjected to colloidal titration using an aqueous N/400 polyvinyl potassium sulfate solution and setting the end point thereof at the time that the color of the solution changed from a blue color to a reddish purple color to find the amount of titration, D (ml).

A blank test was performed by repeating the procedure while using 50 g of deionized water in the place of 50 g of the filtrate to find the amount of titration, E (ml). The soluble content (wt. %) of the sample absorbent resin was calculated in accordance with the following formula using the amounts of titration and the average molecular weight, F, of the monomers forming the absorbent resin.

$$\text{Water-soluble content (wt. \%)} = [E(ml) - D(ml)] \times 0.005/g(g) \times F$$

[Residual monomer]

In 1000 g of deionized water, 0.5 g of a given absorbent resin added thereto was stirred and meanwhile extracted therefrom for two hours. The swelled gelated absorbent resin consequently obtained was filtrated with a filter paper. The filtrate was assayed for residual content by liquid chromatography. Meanwhile, a standard monomer solution of a known concentration was similarly assayed to obtain a calibration curve. The residual content of the sample absorbent resin was determined by using the calibration curve as an external standard and taking into account absorption capacity.

[Change in thickness]

The thickness in the direction of width of a given shaped hydrogel of absorbent resin at the time of the start of gelation was measured at 20 points regularly-interval on the sample and the change in thickness was calculated in accordance with the following formula using the largest measurement as "major thickness" and the smallest measurement as "minimum thickness."

Change in thickness (mm)=Maximum thickness−Minimum thickness

[Rate of change in thickness]

The rate of change in thickness was calculated in accordance with the following formula using the change of thickness mentioned above.

Rate of change in thickness %=(Change in thickness/Maximum thickness)×100

[Average thickness]

The average thickness was calculated in accordance with the following formula using the maximum thickness and the minimum thickness mentioned above.

Average thickness (mm)=(Maximum thickness+Minimum thickness)/2

EXAMPLE 1

The aqueous solution of a monomer consisting of acrylic acid and sodium acrylate (monomer concentration=37 wt. % and ratio of neutralization=75 mol %) and 0.05 mol % of methylene bis acrylamide (based on monomer) were mixed and the resultant aqueous solution of monomer mixture was deaerated by introduction of nitrogen gas. The deaerated aqueous solution was found to have a dissolved oxygen content of 0.8 ppm. This deaerated monomer mixture and potassium persulfate (0.04 g per mol of the monomer) as a polymerization initiator and sodium hydrogen sulfite (0.04 g per mol of the monomer) added thereto were mixed and the produced mixture was continuously supplied at a linear speed of 0.22 m/second onto a movable endless revolving support belt 2 of an apparatus for production illustrated in FIGS. 1 and 2 wherein the difference of level in the direction of width from a monomer mixture supplying device to the point for beginning gelation was not more than 2 mm/1000 mm. One minute after the supply of the mixture of the monomer mixture and the polymerization initiator to the support belt 2, the mixture began polymerization (induction period one minute) and the monomer mixture had a temperature of 20° C. Three minutes after the start of the polymerization, the mixture lost flowability and began gelation. When the thickness of the shaped hydrogel of absorbent resin at that point was measured at 20 points regularly-interval in the direction of width, the span of change was found to be 2 mm and the average thickness was 25 mm. The polymerization peak temperature of the shaped hydrogel of absorbent resin after 10 minutes from the polymerization start was 86° C. When the thickness of the produced shaped hydrogel of absorbent resin was measured at 20 points regularly-interval in the direction of width, the span of change was 2 mm and the average thickness was 23 mm. This shaped hydrogel of absorbent resin was pulverized with a meat chopper and dried with a hot air drier at 160° C. for 65 minutes. The dried hydrogel was pulverized to obtain an absorbent resin (1).

Further, the shaped hydrogel of absorbent resin obtained as described above was divided into three equal parts in the direction of width. The divided parts were respectively pulverized with a meat chopper and dried with a hot air drier at 160° C. for 65 minutes in the same way to obtain absorbent resins (1A), (1B), and (1C). The absorbent resins thus obtained were tested for absorption capacity, water-soluble content, and residual monomer. The results of the test are shown in Table 1.

Control 1

The polymerization of Example 1 was performed by following the procedure thereof while using a support belt 2 similar in shape to the belt device illustrated in FIG. 3 of JP-A-62-156,102 in the place of the movable endless revolving support belt. The belt mentioned above, in a stretched state, possessed a width of 50 cm. A recess 30 cm in width and 15 cm in depth was formed in the belt. One minute after the supply of the mixture of the monomer mixture and the polymerization initiator to the belt 2, the mixture began polymerization (induction period one minute) and the temperature of the monomer mixture was 20° C. Three minutes after the start of the polymerization, the mixture lost flowability and began gelation. When the thickness of the shaped hydrogel of absorbent resin at that time was measured at 20 points regularly-interval in the direction of width, the maximum thickness was 56 mm and the minimum thickness was 26 mm. The polymerization peak temperature of the shaped hydrogel of absorbent resin measured eight minutes thereafter was found to be 107° C. This shaped hydrogel of absorbent resin was pulverized with a meat chopper and dried with a hot air drier at 160° C. for 65 minutes. The dried hydrogel was pulverized to obtain an absorbent resin (1) for comparison.

Further, the resultant reaction product was divided into three equal parts in the direction of width and the divided parts were respectively pulverized with a meat chopper and dried with hot air at 160° C. for 65 minutes. The dried products were pulverized to obtain absorbent resins (1A), (1B), and (1C) for comparison. These absorbent resins were tested for absorption capacity, water-soluble content, and residual monomer. The results of the test are shown in Table 1.

EXAMPLE 2

The aqueous solution of a monomer consisting of acrylic acid and sodium acrylate (monomer concentration=40 wt. % and ratio of neutralization=80 mol %) and 0.10 mol % of methylene bis acrylamide (based on monomer) were mixed and the resultant solution was deaerated by introduction of nitrogen gas. The deaerated aqueous solution was found to have a dissolved oxygen content of 0.6 ppm. This deaerated monomer mixture and potassium persulfate of the initiator (0.10 g per mol of the monomer) and sodium hydrogen sulfite (0.10 g per mol of the monomer) added thereto were mixed and the produced mixture was continuously supplied at a linear speed of 0.18 m/second onto a movable endless revolving support belt 102 of an apparatus for production illustrated in FIGS. 3 and 4 wherein the difference of level in the direction of width from a monomer mixture supplying device to the point for beginning gelation was not more than 2 mm/1000 mm. One minute after the supply of the mixture to the support belt 102, the mixture began polymerization (induction period one minute) and the monomer mixture had a temperature of 17° C. Two minutes after the start of the polymerization, the mixture lost flowability and began gelation. When the thickness of the shaped hydrogel of absorbent resin at that point was measured at 20 points regularly-interval in the direction of width, the span of change was found to be 2 mm and the average thickness was 22 mm. The polymerization peak temperature of the shaped hydrogel of absorbent resin after 8 minutes from the polymerization start was 94° C. This shaped hydrogel of absorbent resin was pulverized with a meat chopper and dried with a hot air drier at 160° C. for 65 minutes. The dried hydrogel was pulverized to obtain an absorbent resin (2).

Further, the shaped hydrogel of absorbent resin obtained as described above was divided into three equal parts in the direction of width. The divided parts were respectively pulverized with a meat chopper and dried with hot air at 160° C. for 65 minutes. The dried hydrogels were respectively pulverized to obtain absorbent resins (2A), (2B), and (2C). The absorbent resins thus obtained were tested for absorption capacity, water-soluble content, and residual monomer. The results of the test are shown in Table 1.

Control 2

The polymerization of Example 2 was performed by following the procedure thereof while using a support belt 2 similar in shape to the belt device illustrated in FIG. 3 of JP-A-62-156,102 in the place of the movable endless revolving support belt. One minute after the supply of the mixture of the monomer mixture and the polymerization initiator to the belt, the mixture began polymerization (induction period one minute) and the temperature of the monomer mixture was 17° C. Two minutes after the start of the polymerization, the mixture lost flowability and began gelation. When the thickness of the shaped hydrogel of absorbent resin at that time was measured at 20 points regularly-interval in the direction of width, the maximum thickness was 43 mm and the minimum thickness was 30 mm. The polymerization peak temperature of the shaped hydrogel of absorbent resin measured six minutes thereafter was found to be 104° C. This shaped hydrogel of absorbent resin was pulverized with a meat chopper and dried with a hot air drier at 160° C. for 65 minutes. The dried hydrogel was pulverized to obtain an absorbent resin (2) for comparison.

Further, the shaped hydrogel of absorbent resin obtained as described above was divided into three equal parts in the direction of width and the divided parts were respectively pulverized with a meat chopper and then dried and pulverized in the same manner as above to obtain absorbent resins (2A), (2B), and (2C) for comparison. These absorbent resins were tested for absorption capacity, water-soluble content, and residual monomer. The results of the test are shown in Table 1.

Control 3

The aqueous solution of a monomer consisting of acrylic acid and sodium acrylate (monomer concentration=50 wt. % and ratio of neutralization=75 mol %) and 0.00337 mol % of trimethylol propane triacrylate (based on monomer) and potassium persulfate (0.005 g per mol of the monomer) were mixed and the resultant solution was deaerated by introduction of nitrogen gas. The deaerated aqueous solution was found to have a dissolved oxygen content of 0.9 ppm. This deaerated monomer mixture was continuously supplied onto a movable endless revolving support belt 2 of the same apparatus as used in Example 1. Two minutes after the supply of the mixture of the monomer mixture and the polymerization initiator to the support belt 2, the mixture began polymerization (induction period two minutes) and the monomer mixture had a temperature of 50° C. Two minutes after the start of the polymerization, the mixture lost flowability and began gelation. When the thickness of the shaped hydrogel of absorbent resin at that point was measured at 20 points regularly-interval in the direction of width, the span of change was found to be 2 mm and the average thickness was 8 mm. The polymerization was continued with the temperature maintained at 50–60° C. during the course of the polymerization.

This shaped hydrogel of absorbent resin was pulverized with a meat chopper and dried with a hot air drier at 160° C. for 65 minutes. The dried hydrogel was pulverized to obtain an absorbent resin (3) for comparison.

Further, the shaped hydrogel of absorbent resin obtained as described above was divided into three equal parts in the direction of width. The divided parts were respectively pulverized with a meat chopper and then dried and pulverized in the same manner as above to obtain absorbent resins (3A), (3B), and (3C). The absorbent resins thus obtained were tested for absorption capacity, water-soluble content, and residual monomer. The results of the test are shown in Table 1.

TABLE 1

|  | Change in thickness (mm) | Rate of change in thickness (%) | Absorption capacity (g/g) | Water-soluble content (%) | Residual monomer (ppm) |
|---|---|---|---|---|---|
| Example 1 | 2 | 8 |  |  |  |
| An absorbent resin (1) |  |  | 56 | 6 | 270 |
| An absorbent resin (1A) |  |  | 57 | 6 | 280 |
| An absorbent resin (1B) |  |  | 56 | 6 | 250 |
| An absorbent resin (1C) |  |  | 57 | 6 | 270 |
| Control 1 | 30 | 54 |  |  |  |
| An absorbent resin (1) for comparison |  |  | 46 | 15 | 340 |
| An absorbent resin (1A) for comparison |  |  | 49 | 13 | 370 |
| An absorbent resin (1B) for comparison |  |  | 42 | 21 | 320 |
| An absorbent resin (1C) for comparison |  |  | 48 | 12 | 360 |
| Example 2 | 2 | 9 |  |  |  |
| An absorbent resin (2) |  |  | 44 | 4 | 210 |
| An absorbent resin (2A) |  |  | 44 | 4 | 200 |
| An absorbent resin (2B) |  |  | 44 | 4 | 220 |
| An absorbent resin (2C) |  |  | 43 | 4 | 210 |
| Control 2 | 13 | 30 |  |  |  |
| An absorbent resin (2) for comparison |  |  | 42 | 8 | 250 |
| An absorbent resin (2A) for comparison |  |  | 41 | 7 | 270 |
| An absorbent resin (2B) for comparison |  |  | 44 | 10 | 220 |
| An absorbent resin (2C) for comparison |  |  | 42 | 7 | 260 |
| Control 3 | 2 | 22 |  |  |  |
| An absorbent resin (3) for comparison |  |  | 43 | 8 | 1050 |
| An absorbent resin (3A) for comparison |  |  | 45 | 13 | 920 |
| An absorbent resin (3B) for comparison |  |  | 40 | 6 | 1260 |
| An absorbent resin (3C) for comparison |  |  | 46 | 14 | 860 |

Since the method of this invention is as described above, it permits production at a high productivity rate of a shaped hydrogel of absorbent resin which affords a polymerization reaction system uniform heat conduction throughout the entire volume of the system during the course of cooling or heating, consequently enables the reaction of polymerization to proceed uniformly, exhibits high absorption capacity, and little water-soluble content and little residual monomer.

It is obvious that this invention is not limited to the particular embodiments shown and described above but may be variously changed and modified without departing from the technical concept of this invention. Further, the entire disclosure of Japanese Patent Application No. 10-119408 filed on Apr. 28, 1998, No. 10-133771 filed on May 15, 1998, and No. 10-237705 filed on Aug. 24, 1998, including the specification, claims, drawings and summary are incorporated herein by reference in its entirety.

What is claimed is:

1. A method for continuously producing a shaped hydrogel of absorbent resin by continuously supplying in the form of a layer a monomer mixture capable of forming an absorbent resin and polymerizing said layer of said monomer mixture to form a shaped hydrogel, characterized by retaining the rate of change of the thickness in the direction of width of said layer of shaped hydrogel of absorbent resin at the time of formation of gel at a level of not more than 20%.

2. A method according to claim 1, wherein the change in the thickness in the direction of width of said layer of shaped hydrogel of absorbent resin at the time of formation of gel is retained below 5 mm.

3. A method according to claim 1, wherein the average thickness of said layer of hydrogel of absorbent resin at the time of formation of gel is not less than 20 mm.

4. A method according to claim 1, which is implemented by the use of an apparatus for production of a shaped hydrogel of absorbent resin, comprising a movable endless revolving support belt, a monomer mixture supplying device, and a device for discharging a shaped hydrogel of absorbent resin.

5. A method according to claim 4, wherein said apparatus for production is provided near each of opposite lateral parts of said movable endless revolving support belt with a lateral weir adapted to move in concert with said belt.

6. A method according to claim 5, wherein said lateral weir is fixed to the entire periphery of said movable endless revolving support belt.

7. A method according to claim 5, wherein said lateral weir is installed from the upstream side of said monomer mixture supplying device in the direction of travel of the monomer mixture to the position terminating at least one tenth of the length from said monomer mixture supplying device to said device for discharging said shaped hydrogel of absorbent resin.

8. A method according to claim 5, wherein said lateral weir has a height in the range of 10–70 mm.

9. A method according to claim 5, wherein said lateral weir uses a material having a coefficient of expansion of not more than 10%.

10. A method according to claim 4, wherein said apparatus for production is provided near each of the opposite lateral parts of said movable endless revolving support belt with a lateral weir fixed so as to contact said belt in a sliding manner.

11. A method according to claim 10, wherein said lateral weir is installed from the upstream side of said monomer mixture supplying device in the direction of travel of the monomer mixture to the position terminating at least one tenth of the length from said monomer mixture supplying device to said device for discharging said shaped hydrogel of absorbent resin.

12. A method according to claim 10, wherein said lateral weir has a height in the range of 10–70 mm.

13. A method according to claim 10, wherein said lateral weir uses a material having a coefficient of expansion of not more than 10%.

14. A method according to claim 4, wherein said apparatus for production is provided with an open-close tack weir disposed on the downstream side of said movable endless revolving support belt relative to said monomer mixture supplying device in a direction nearly perpendicular to the direction of travel of said belt in such a manner as to contact said belt in a sliding state.

15. A method according to claim 4, wherein said apparatus for production is provided with a terminal weir disposed on the upstream side of said movable endless revolving support belt relative to said monomer mixture supplying device in a direction nearly perpendicular to the direction of travel of said belt in such a manner as to contact said belt in a sliding state.

16. A method according to claim 15, wherein said terminal weir is a revolving roll.

17. A method according to claim 15, wherein said terminal weir uses a material having a coefficient of expansion of not more than 10%.

18. A method according to claim 10, wherein said apparatus for production is provided with a terminal weir disposed on the upstream side of said movable endless revolving support belt relative to said monomer mixture supplying device in a direction nearly perpendicular to the direction of travel of said belt in such a manner as to contact said belt in a sliding state and said terminal weir is integrally formed with a lateral weir.

19. A method according to claim 4, wherein said movable endless revolving support belt forms near said monomer mixture supplying device an inclination descending toward the downstream of said belt in the direction of travel of said belt.

20. A method according to claim 19, wherein the angle of inclination of said movable endless revolving support belt near said monomer mixture supplying device relative to the horizontal plane is in the range of 0.1–45 degrees.

21. A method according to claim 19, wherein said inclination is formed at least from the upstream of the monomer mixture supplying device in the direction of travel to the point at which the polymer system is gelated.

22. A method according to claim 4, wherein said movable endless revolving support belt is possessed of a cooling and/or heating surface.

23. A method according to claim 22, wherein said cooling and/or heating surface of said movable endless revolving support belt is adapted to contact directly the monomer mixture.

24. A method according to claim 4, wherein said method is carried out under an atmosphere of an inert gas.

* * * * *